United States Patent [19]

Cipelletti

[11] Patent Number: 4,607,494

[45] Date of Patent: Aug. 26, 1986

[54] APPARATUS FOR THE PASTEURIZATION OF ALIMENTARY MIXTURES

[75] Inventor: Alberto Cipelletti, Guardamiglio, Italy

[73] Assignee: Ditta Alberto Cipelletti, Italy

[21] Appl. No.: 735,875

[22] Filed: May 20, 1985

[30] Foreign Application Priority Data

May 18, 1984 [IT] Italy .............................. 21845/84[U]
May 18, 1984 [IT] Italy .............................. 21846/84[U]

[51] Int. Cl.⁴ .......................................... F25D 25/00
[52] U.S. Cl. ........................................ 62/62; 62/278; 62/352
[58] Field of Search ................... 62/278, 342, 352, 62

[56] References Cited

U.S. PATENT DOCUMENTS

| | | | |
|---|---|---|---|
| 3,236,060 | 2/1966 | Clark, Jr. | 62/342 |
| 3,267,688 | 8/1968 | Carpigiani | 62/342 |
| 3,291,200 | 12/1966 | Lutz | 62/342 |
| 3,811,494 | 5/1974 | Menzel | 62/342 |
| 4,476,146 | 10/1984 | Manfroni | 62/278 |
| 4,522,041 | 6/1985 | Menzel | 62/342 |

Primary Examiner—Ronald C. Capossela
Attorney, Agent, or Firm—Lerner, David, Littenberg, Krumholz & Mentlik

[57] ABSTRACT

The invention concerns a process to perform the alimentary mixtures pasteurization in apparatuses of the type comprising a refrigerating circuit provided with compressor, condenser, expansion valve and evaporator and at least one vessel to contain the alimentary mixture under conditions of thermal exchange with at least one coil. The process according to the invention is characterized in that it comprises the steps of:

(a) heating the mixture contained in at least one vessel connecting the components of the refrigerating circuit and the coil to each other in the following order: compressor, coil, condenser, expansion valve, evaporator, compressor (b) cooling the mixture contained in the vessel connecting the components of the refrigerating circuit and the coil to each other in the following order: compressor, condenser, expansion valve, coil evaporator, compressor.

The invention also comprises a pasteurizing apparatus to perform the process; said apparatus, of the aforesaid type, is characterized in that said evaporator of the refrigerating circuit comprises valve means to deviate the refrigeration fluid capable of connecting to the refrigerating circuit itself the coil of at least one vessel upstream the condenser or downstream the evaporator to heat or to cool respectively the content of the vessel itself.

8 Claims, 2 Drawing Figures

APPARATUS FOR THE PASTEURIZATION OF ALIMENTARY MIXTURES

BACKGROUND OF THE INVENTION

FIELD OF THE INVENTION

The present invention concerns a process to carry out the pasteurization of alimentary mixtures and an apparatus to perform said process.

As it is known, the pasteurization of alimentary mixtures is performed by heating the mixture up to a suitable temperature for the destruction of germs (60°-90° C.), keeping said temperature for a given period of time, then cooling the mixture down to the preservation temperature of same.

For this purpose, in conventional pasteurizing apparatuses, the vessel containing the alimentary mixture is under conditions of thermal exchange with electric resistors, which produce the necessary calories for heating the mixture, as well as with a coil constituting the evaporator of a refrigerating circuit which carries out the subsequent cooling of said mixture.

In order to decrease the energy consumption in said machines, pasteurizing apparatuses were proposed in which the mixture heating is performed by using both the electric resistors and the heat produced by the compressor of the refrigerating circuit during the work of gas compression. To this end, the hot gas coming out of the compressor is fed directly to the coil under conditions of thermal exchange with the vessel and bypasses, through appropriate ducts, both the condenser and the lamination valve of the refrigerating circuit.

Said machines, though achieving the object of reducing energy consumption, have the drawback submitting the compressor of the refrigerating circuit to overstresses due to failed expansion and evaporation of the refrigeration fluid. In fact, during the stage of mixture heating, the refrigeration fluid does not pass through the condenser and the expansion valve and is recirculated into the compressor at a high pressure and, specially at the end of the heating stage, at a high temperature.

OBJECTS OF THE INVENTION

An object of the present invention is therefore to provide a pasteurization process and apparatus which allow to obtain the energy saving offered by the machines in which the mixture is heated by gas compression, though not presenting the abovesaid drawback.

SUMMARY OF THE INVENTION

Said object is achieved by means of a process to perform the alimentary mixtures pasteurization in apparatuses comprising a gas compression refrigerating circuit with gas compressor, condenser, expansion valve and evaporator and at least one vessel containing the mixture to be pasteurized under conditions of thermal exchange with at least one coil, characterized in that it comprises the steps of:

(a) heating the mixture contained in at least one vessel connecting the components of the refrigerating circuit and the coil to each other in the following order: compressor, coil, condenser, expansion valve, evaporator, compressor;

(b) cooling the mixture contained in the vessel connecting the components of the refrigerating circuit and the coil to each other in the following order: compressor, condenser, expansion valve, coil, evaporator, compressor.

In particular, in order to exploit both the heat produced by the compression work and the refrigeration units produced by the expansion of the refrigeration fluid, the steps of heating and cooling can be performed simultaneously and alternatively in two separate vessels connecting the components of the refrigerating circuit and the coils of the two vessels to each other in the following order: outlet section of the compressor, coil of the vessel to be heated, condenser, expansion valve, coil of the vessel to be cooled, evaporator, inlet section of the compressor.

The process according to the invention is carried out in a pasteurizing apparatus of the type comprising a gas compression refrigerating circuit provided with gas compressor, condenser, expansion valve and evaporator and at least one vessel containing the mixture to be pasteurized under conditions of thermal exchange with at least one coil, characterized in that said evaporator of the refrigerating circuit is an air heat exchanger and in that the refrigerating circuit comprises valve means to deviate the refrigeration fluid, capable of connecting the refrigerating circuit itself to the coil of at least a vessel upstream the condenser or downstream the evaporator in order to heat or to cool respectively the contents of the vessel itself.

In the apparatus according to the invention during the heating stage, the refrigerating fluid coming out of the coil is first of all fed to the condenser where, specially at the end of said heating stage, it can condense completely; it is then expanded through the expansion valve and finally evaporated in the air evaporator in which it yields its refrigeration units. In this way, when the refrigerating circuit is used to heat the alimentary mixture, the refrigeration fluid can be expanded and evaporated completely before it is recirculated into the compressor, assuring regular operation of the latter.

In order to avoid that during the subsequent cooling stage of the mixture, and mainly at the beginning of said stage, an excessive heat amount invades the external ambient, the condenser of the refrigerating circuit of the apparatus according to the invention consists of two heat exchangers, the first one of which is a water heat exchanger and the second one an air heat exchanger.

Finally the air condenser and said air evaporator are placed under conditions of reciprocal heat exchange in order to enhace both the condensation and the evaporation of the refrigeration fluid.

These and other features and characteristics of the pasteurization process and of the relevant pasteurizing apparatus according to the invention will be now described with reference to an embodiment of the apparatus itself, schematically illustrated in the accompanying drawing.

DESCRIPTION OF THE PREFERRED EMBODIMENTS

Figure 1:
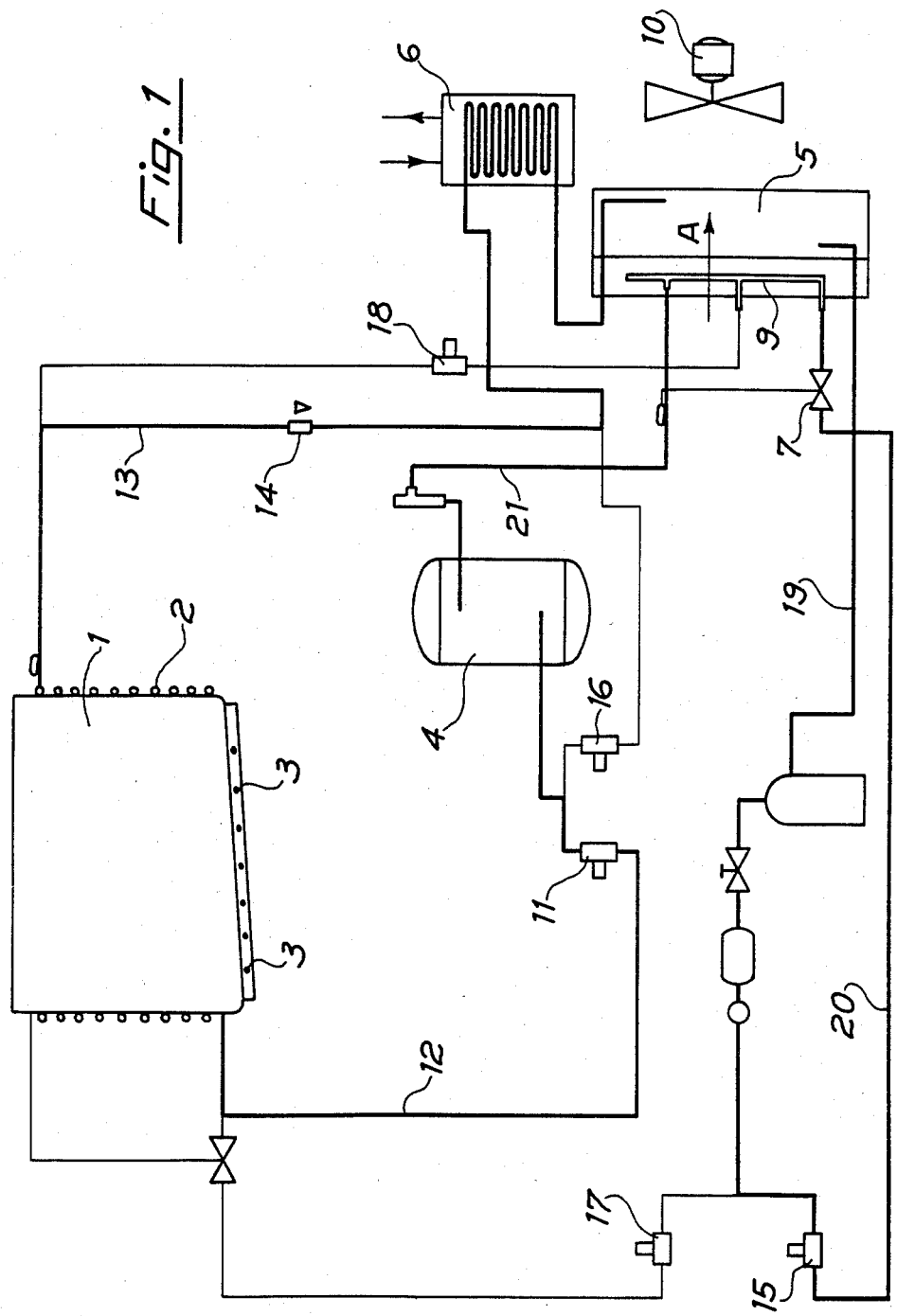
FIG. 1 is a diagram of the apparatus refrigerating circuit, showing in evidence the path of the refrigeration fluid during the alimentary mixture heating
Figure 2:
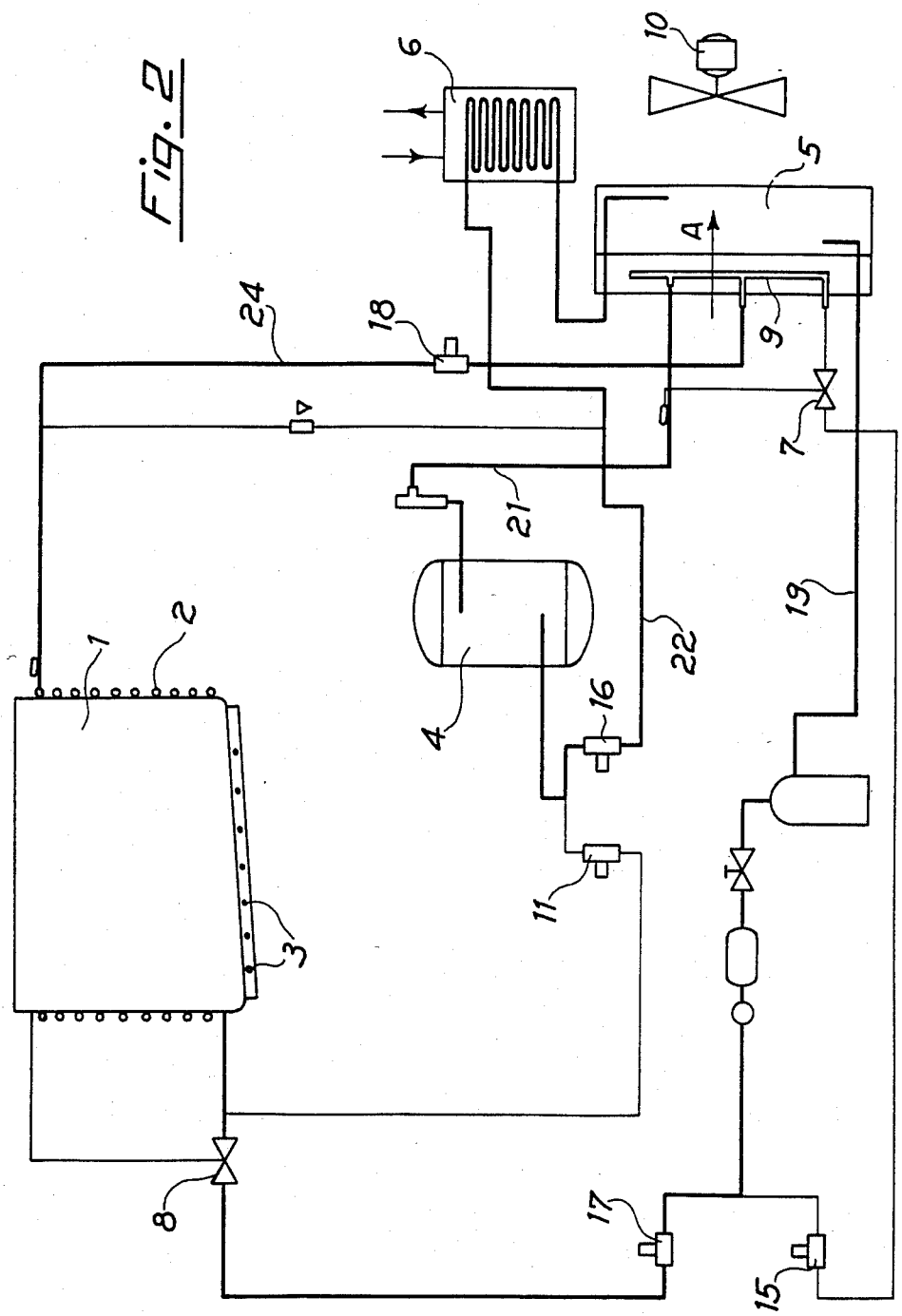
FIG. 2 is a diagram similar to the one of FIG. 1 but showing in evidence the path of the refrigeration gas during the alimentary mixture cooling.

With reference to the drawing, the pasteurizing apparatus according to the invention essentially comprises a vessel 1 containing the alimentary mixture under conditions of thermal exchange with one or more coils 2 and a refrigerating circuit with gas compression consisting of a compressor 4, an air condenser 5, a water condenser 6, two expansion valves 7 and 8, and air evaporator 9 and said coils 2.

The condenser 5 and evaporator 9, both provided with cooling fins, are placed under conditions of reciprocal thermal exchange and are run over by an air flow coming from a fan 10. The air flow is preferably directed in a way as to firstly reach the condenser 5 and then the evaporator 9, but a fan of reversible type can be foreseen which automatically reverses the direction of the air flow when the system shifts from the heating stage to the cooling stage and vice versa.

The refrigerating circuit comprises also solenoid valves 11, 15, 16, 17 and 18 and ducts 12, 13, 19, 20, 21, 22, 23 and 24 which allow to alternatively and selectively use the circuit itself either as refrigerating circuit or heat pump to cool or to heat respectively the alimentary mixture. In order to better understand how the circuit is conceived, it is useful to follow the course of the refrigerating fluid during the two stages of heating and cooling the vessel 1, respectively.

First of all considering the heating stage of the alimentary mixture and referring to FIG. 1, the solenoid valves 11 and 15 are opened while the solenoid valves 16, 17 and 18 are closed. In this way the vessel 1 is heated by the refrigerating circuit operating as heat pump.

In particular, the gas compressed and heated by the compressor 4 is fed, through the solenoid valve 11 and the duct 12, to the coil 2 where it yields calories to the vessel 1 and condenses. From the coil 2, through duct 13 and check valve 14, the refrigerating fluid is firstly fed to the water condenser 6 and then to the air condenser 5 in which it completely condenses. The fluid coming out from the condenser 5 is fed, through the duct 19, the solenoid valve 15 and the duct 20, to the expansion valve 7 where it expands while cooling. Then the expanded gas passes through the evaporator 9 where it yields its refrigeration units completely evaporating and, through the duct 21, it returns to the compressor 4 to start the cycle again. First of all it must be noticed that, at the beginning of the heating stage, the gas coming from the compressor 4 yields all its calories to the vessel 1 and completely condenses; during said first period the condensers 5 and 6 do not practically receive any calories while the refrigeration units yielded by the gas to the evaporator 7 have the effect of dehumidifying and cooling the ambient air drawn by the fan 10.

As the vessel 1 gets hot due to the electric resistors 3 and the heat produced by the compression work, the heat amount yielded by the gas to the vessel 1 itself decreases and consequently the quantity of gas condensing in the coil 2 decreases as well. The condensers 5 and 6 begin therefore to dissipate the heat which is partly absorbed by the water fed to the condenser 6 and partly by the cold air coming from the evaporator 9 and pushed by the fan 10 through the condenser 5. In particular, by regulating the water flow fed to the condenser 6, it is possible to adjust the temperature of the air coming out of the condenser 5 and therefore essentially the ambient temperature. In fact, the greater is the water flow fed to the condenser 6, the greater is the heat amount that the latter withdraws from the gas and consequently the smaller is the heat quantity yielded to the condenser 5, from which air comes out at a temperature near the one of evaporator 9. The compressor 4 can be designed in such a way as to produce all the necessary calories to heat the mixture up to the maximum pasteurization temperature or, should a compressor of smaller capacity be used, electric resistors 3 can be foreseen under conditions of thermal exchange with the vessel 1, which provide the necessary calories to bring the mixture from the temperature of the refrigerating gas coming out of the compressor up to the maximum desired temperature. In the latter case, when the alimentary mixture reaches 60 C. approximately, the refrigerating circuit stops and the necessary heat to bring the mixture to the maximum temperature of pasteurization is supplied only by the electric resistors 3.

Now considering the stage of cooling the vessel 1, the solenoid valves 11 and 15 are closed while the solenoid valves 16, 17 and 18 are opened. In this way the hot gas coming out of the compressor is fed, through the valve 16 and duct 22, first of all to the water condenser 6 and then to the air condenser 5 where it cools and completely condenses. The refrigerating fluid from the condenser 5 passes through the duct 19, the solenoid valve 17 and reaches the expansion valve 8 where it expands while cooling. The cold gas then penetrates into the coil 2 where it yields its refrigerating units to the alimentary mixture. Therefrom, through the duct 24 and the solenoid valve 18, the gas reaches the evaporator 9, where it completely evaporates. From the evaporator, through duct 21, the gas returns to the compressor in order to restart the cycle.

It must be noticed that at the beginning of the cooling stage, considering the high temperature of the alimentary mixture, the gas coming out of the coil 2 not only completely evaporates, but it is also at a high temperature near to the maximum temperature of pasteurization. During this first period, the evaporator 9 has therefore the important function of cooling the gas which otherwise would reach the compressor too hot, damaging it.

The heat produced by the compression work is absorbed partly by the water condenser 6 and partly by the air condenser 5. In this stage, too, by regulating the water flow fed to the condenser 6, it is possible to adjust the temperature of the air coming out of the air condenser 5. In fact, the greater the water flow fed to the condenser 6, the greater the heat quantity absorbed by the latter is, and consequently the smaller the heat quantity yielded to the air fed through the condenser 5 will be. It is evident that, if there was not the water condenser 6, not only the condenser 5 should be considerably dimensioned, but also all the calories produced by the compression work would be yielded to the ambient air with obvious inconvenience for the user.

As the temperature of the alimentary mixture decreases, the temperature of the gas coming out of the coil 2 decreases as well, and the evaporator 9 starts to carry out its function.

Thus colder and colder air begins to flow towards the condenser 5 and consequently the function performed by the water condenser 6 becomes less and less essential. In particular, when the mixture is at a temperature near the temperature of preservation, keeping constant the water flow to the condenser 6, cold and dehumidified air comes out of the pasteurizing apparatus.

Essentially the water condenser 6 performs two important functions: during the first part of the cooling stage and the last part of the heating stage, it withdraws most of the calories produced by the compression work which otherwise would be yielded to the ambient air with consequent raise of temperature; during the remaining parts of the cooling and heating stages, it allows, according to the entity of the water flow, to humidify and cool the ambient air and in any case to control the temperature of the air coming out of the pasteurizing apparatus.

The flow of water fed to the condenser 6 can be automatically regulated in a way as to keep the temperature of the air coming out of the condenser 5 within preset values. For this purpose it is sufficient to foresee a solenoid valve capable of varying the water flow to the condenser 6 according to the temperature of the condenser 5. Of course, the water condenser and the air condenser can be sized in a way as to be capable of eliminating all the calories produced during the heating and cooling stages, so as to allow the user to vary the water flow to the water condenser according to his needs and/or to local water availability.

As stated above, the apparatus according to the invention can comprise more than one vessel. For example, having two vessels available, it is possible to perform simultaneously the heating of one vessel and the cooling of the other one, in this way exploiting both the heat produced by the compression work and the refrigeration units produced by the expansion of the refrigeration fluid. For this purpose it is enough to provide the refrigerating circuit with fittings and switch valves to deviate the refrigeration fluid, said fittings and valves allowing to connect the components of the refrigerating circuit and the coils to each other under conditions of thermal exchange with the vessels in the following order: outlet section of the compressor, coil of the vessel to be heated, condenser, expansion valve, coil of the vessel to be cooled, evaporator, inlet section of the compressor. In this way, once the content of one vessel is heated, it is possible to use the apparatus continuously by simultaneously and alternatively cooling and heating to two vessels.

I claim:

1. A process for pasteurizing an alimentary mixture in an apparatus comprising a refrigerating circuit including a compressor, a condenser, an expansion valve and an evaporator and further comprising a first vessel containing the mixture to be pasteurized and a first heat exchange coil arranged for thermal exchange with the mixture in said first vessel, said process comprising the steps of:
   a. heating the mixture contained in said first vessel by circulating refrigerant from said compressor through said heat exchange coil, then through said condenser, then through said expansion valve, then through said evaporator and then back to said compressor; and
   b. cooling the mixture contained in said first vessel by circulating refrigerant from said compressor through said condenser, then through said expansion valve, then through said first heat exchange coil, then through said evaporator, and then back to said compressor.

2. A process according to claim 1, wherein, during said heating step, the refrigerant is passed from said expansion valve to said evaporator via a second heat exchange coil arranged for thermal exchange with mixture contained in a second vessel, whereby the mixture contained in said second vessel is cooled while the mixture contained in said first vessel is heated.

3. An apparatus for heating and cooling an alimentary mixture comprising:
   (a) a first vessel for holding the mixture;
   (b) a first heat exchange coil juxtaposed with said first vessel for thermal exchange with mixture disposed in said first vessel;
   (c) refrigeration elements including a compressor, a condenser, an expansion valve and an evaporator; and
   (d) connection means for selectively connecting said refrigeration elements and said first heat exchange coil in a closed circuit for circulation of refrigerant either:
      (1) in a first-vessel heating mode in the following upstream to downstream order: compressor, first heat exchange coil, condenser, expansion valve, evaporator, compressor; or
      (2) in a first-vessel cooling mode in the following upstream to downstream order: compressor, condenser, expansion valve, first heat exchange coil, evaporator, compressor 4. An apparatus as claimed in claim 3 further comprising a second vessel and a second heat exchange coil juxtaposed therewith, said connection means being operative to connect said second heat exchange coil downstream of said expansion valve but upstream of said evaporator in said first vessel heating mode, and to connect said second heat exchange coil downstream of said compressor but upstream of said condenser in said first vessel cooling mode.

5. An apparatus according to claim 3, wherein said condenser includes an air-cooled section adapted to transfer heat from refrigerant to air in contact with such section, said evaporator includes an airheated section adapted to transfer heat from air in contact with such section to refrigerant, the apparatus further comprising means for contacting a stream of air with both said air-cooled section of said condenser and said air-heated section of said evaporator.

6. An apparatus according to claim 3 wherein said condenser includes a water-cooled section adapted to transfer heat from refrigerant to water and an aircooled section adapted to transfer heat from refrigerant to air, said sections being connected in series with respect to the direction of circulation of refrigerant, said water-cooled section being upstream of said air-cooled section.

7. An apparatus according to claim 6, wherein said evaporator includes an air-heated section adapted to transfer heat from air to refrigerant, the apparatus further comprising means for contacting a stream of air with both said air-cooled section of said condenser and said airheated section of said evaporator.

8. An apparatus according to claim 3, further comprising an electric resistor juxtaposed with said first vessel for heating mixture contained therein.

* * * * *